Sept. 2, 1952     E. E. HEINZELMAN     2,608,721
MOLDING MACHINE
Filed Feb. 28, 1949     4 Sheets-Sheet 1

Inventor
Earl E. Heinzelman
by
Walter + Kaufman
Attorney

Sept. 2, 1952 E. E. HEINZELMAN 2,608,721
MOLDING MACHINE

Filed Feb. 28, 1949 4 Sheets—Sheet 2

Sept. 2, 1952      E. E. HEINZELMAN      2,608,721
MOLDING MACHINE
Filed Feb. 28, 1949      4 Sheets-Sheet 3
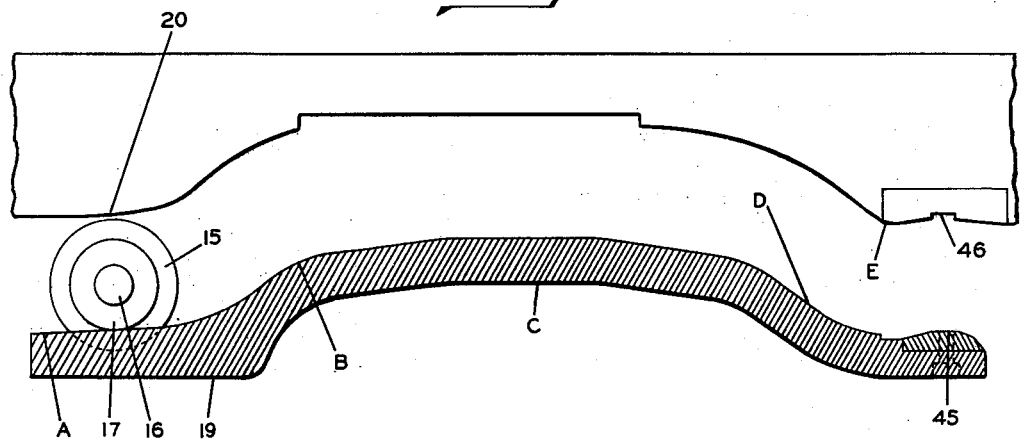
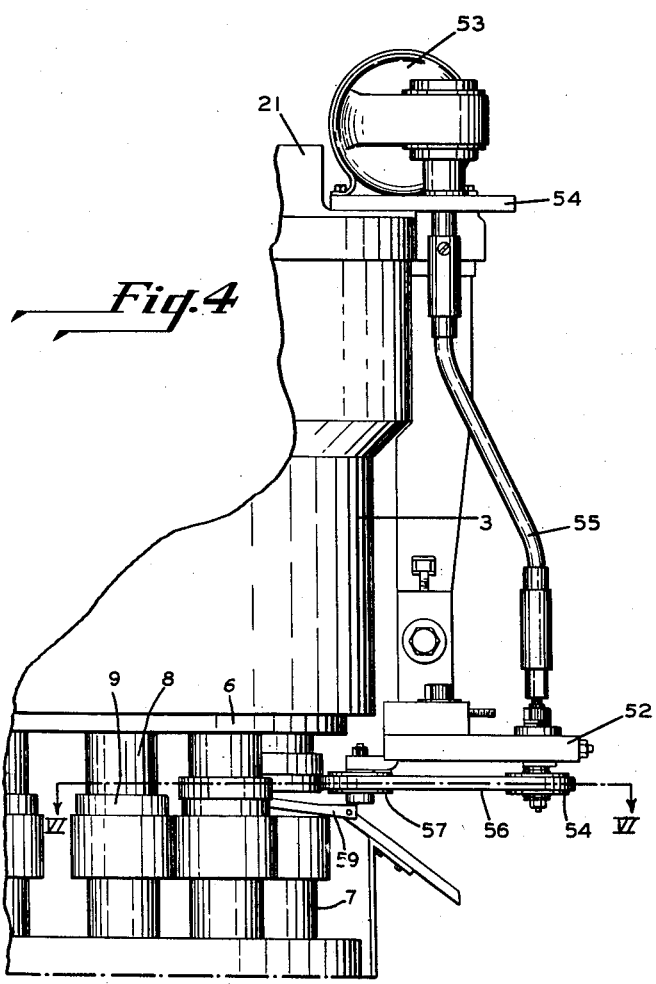

Sept. 2, 1952 E. E. HEINZELMAN 2,608,721
MOLDING MACHINE
Filed Feb. 28, 1949 4 Sheets-Sheet 4
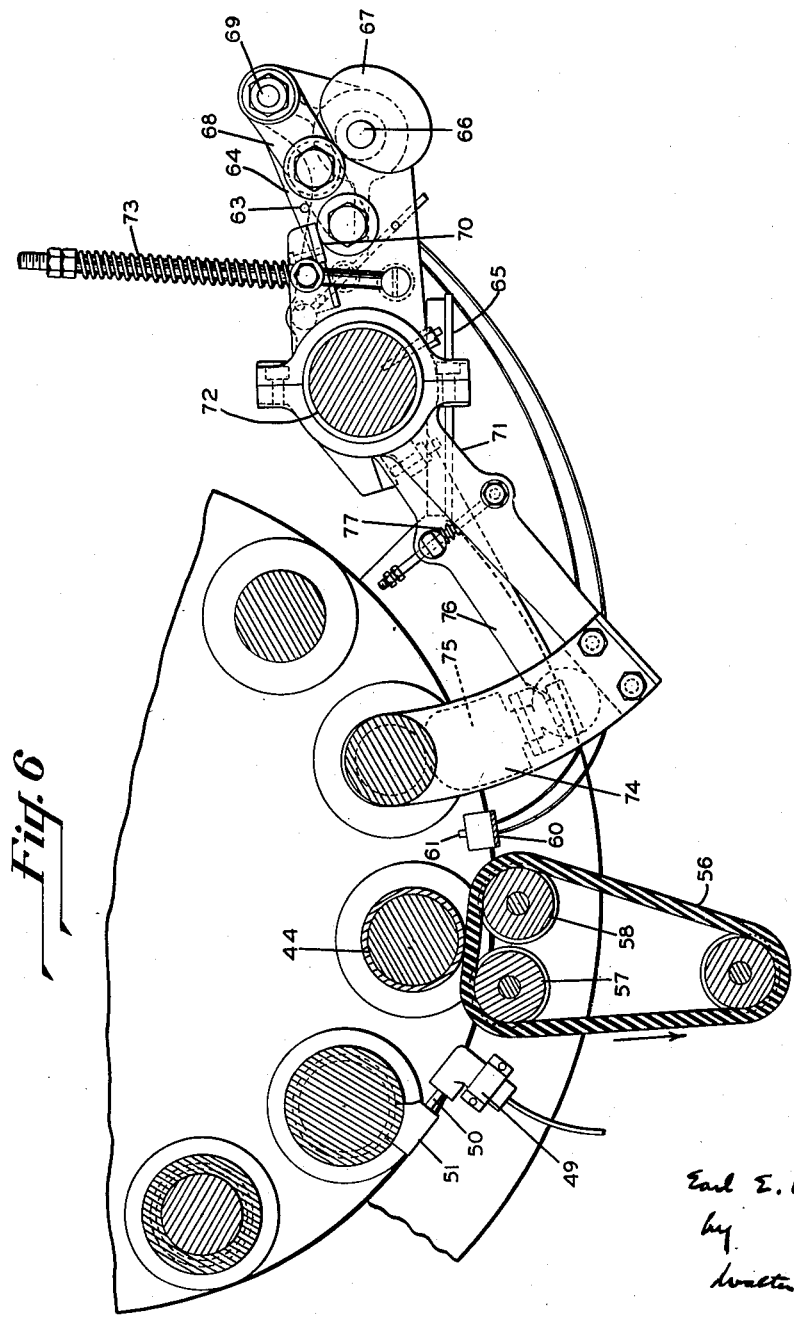

Patented Sept. 2, 1952

2,608,721

UNITED STATES PATENT OFFICE 2,608,721

MOLDING MACHINE

Earl E. Heinzelman, Manheim Township, Lancaster County, Pa., assignor to Armstrong Cork Company, Lancaster, Pa., a corporation of Pennsylvania Application February 28, 1949, Serial No. 78,801

7 Claims. (Cl. 18—20)

Certain features disclosed in this application are claimed in my copending application Serial No. 187,791, filed September 30, 1950, which is a continuation-in-part of this application.

This invention relates to a device for forming moldable compositions and is more particularly concerned with the art of rotary machines for molding plastic compositions.

In the manufacture of molded articles it has been common practice to employ a rotary molding device in which a plurality of complementary molding elements are arranged to travel in a closed circular path. Many different types of devices have been developed for applying molding pressure to molding compositions carried by mold cavities. One type which has been found particularly desirable is disclosed in Bergmann Patent No. 2,304,141, issued December 8, 1942. In the device disclosed in the Bergmann patent the mold is opened and closed by a ram moving through a predetermined path of travel carrying one of the mold elements. The predetermined travel of the ram is such that the mold is closed, and the complementary mold element is forced against a hydraulic cushion. The pressure on the hydraulic fluid in the system exerts the molding pressure on the molding composition in the mold cavity.

In machines of the Bergmann type it is necessary to employ pistons and packings in the hydraulic system. Due to constant usage, the packings become worn and permit a certain amount of hydraulic fluid to leak from the system, resulting in a diminution of pressure exerted on the articles being molded; and it is necessary to install a pump in the hydraulic circuit to maintain a relatively uniform pressure. Also in machines of the Bergmann type, the force plug unit of the mold assembly is cushioned by the hydraulic system, making it impractical to employ any knock-out device to strip molded articles from the force plug.

The device disclosed herein employs a fluid cushioning system, and such system is sealed so that it is impossible for leaks to occur.

An object of this invention is to provide a molding machine in which one of the molding elements acts on a cushion of fluid which is enclosed in a sealed system.

Another object of this invention is to provide a rotary molding machine in which heaters are employed to heat the mold elements conductively, the heaters from one set of mold elements being controlled separately from the heaters of the other set of mold elements.

A still further object of this invention is to provide a rotary molding machine in which one of the mold members is rotated through an acute angle at the start of the mold opening operation to break the bond between the molded article and the mold element to facilitate unscrewing.

In order that my invention may be more readily understood, it will be described in connection with the attached drawing in which:

Figure 3 is a diagrammatically developed view illustrating a system of cams for imparting movement to the mold elements;

Figure 4 is a detailed view of an unscrewing device suitable for use with my machine;

Figure 6 is a sectional view taken on the line VI—VI of Figure 4.

Figure 1:
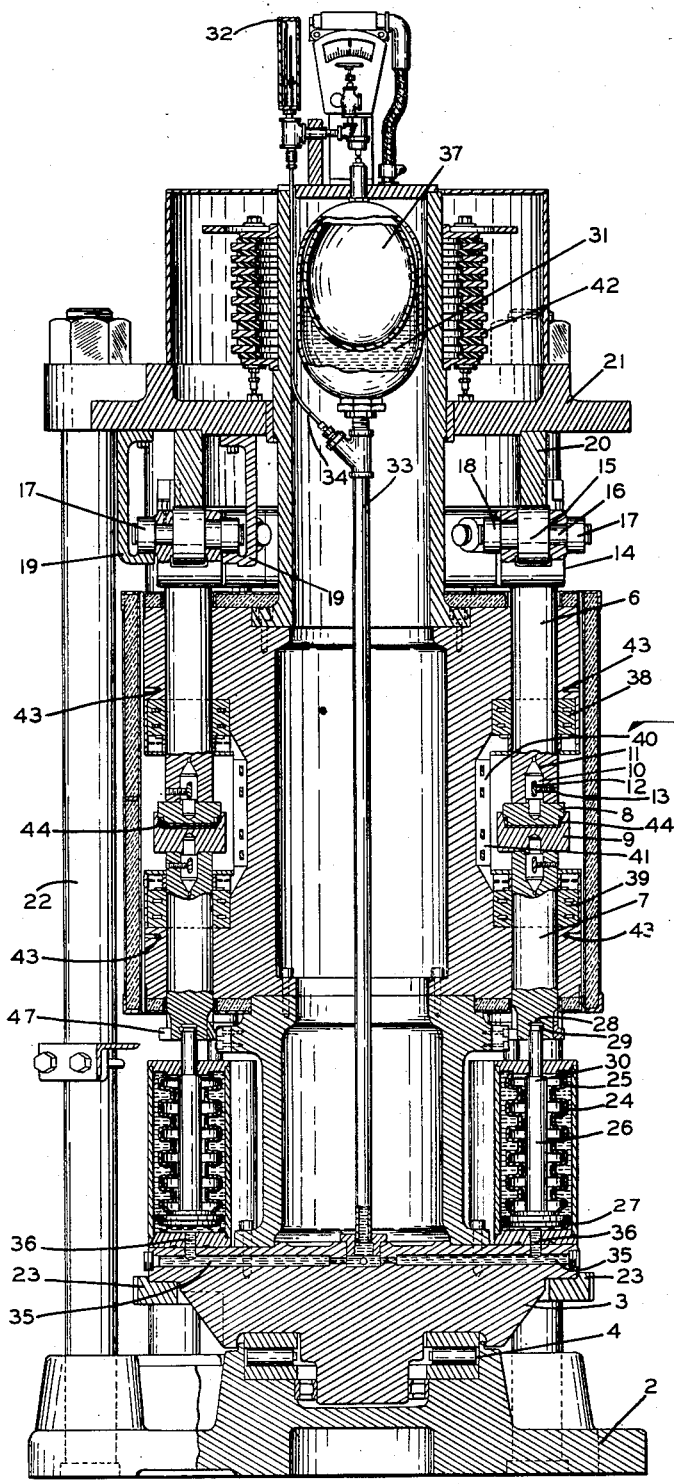
Figure 1 is a longitudinal cross-sectional view of the machine of my invention taken on the line I—I of Figure 2.

Referring to Figure 1 there is shown a base 2 on which is rotatably supported a carrier 3. The carrier 3 rotates on a series of roller bearings 4 positioned between the base 2 and the bottom part of the carrier 3. For ease in casting, the carrier 3 is made in several parts which are held together by means of studs. The construction of the carrier is clearly shown in Figure 1 of the drawing.

The carrier 3 is provided with a series of complementary top and bottom plungers 6 and 7 respectively which are axially aligned with one another in vertical openings drilled through circumferential radial extensions of the carrier 3. These complementary plungers carry the molding tools. The top plungers 6 carry the male member or force plug 8, and the bottom plungers 7 carry the female member or mold cavity 9. These molding elements are secured to the plungers by means of studs 10, one end of which screws into the back of the mold element and the other end of which fits into a tubular opening 11 in the end of the plunger. These studs are held in the plungers by means of a key 12 which is driven through an opening in the wall of the plunger and through an opening in the stud 10. This key 12 is locked in place by means of a set screw 13 which fits into a drilled hole in the side of the plunger. It will be understood, of course, that other means of attaching the mold elements to the plungers may be used if desired; and the system illustrated is given only as an example of a satisfactory means.

The top plungers 6 are provided on the end opposite the mold element with a bifurcated member 14 which accommodates a cam roller 15 which is secured thereto by means of a spindle 16 passing through a hole in the center of the roller 15 and holes in each side of the bifurcated member 14. The ends of the spindle 16 carry two smaller cam rollers 17 and 18 which are adapted to engage a lifting cam 19 attached to the head of the machine in the zone of the circular path of the carrier in which the completed articles are removed from the mold and a new charge of material placed therein. This cam roller 15 engages a cam 20 which is attached to the head 21 of the machine. The head 21 is rigidly secured to the base by means of four columns 22 which are secured to the base 2 and extend to the top of the machine. It will be clear from this disclosure that the head 21 and the cams 20 and 19 do not rotate; but, in turn, the rollers 15, 17, and 18 travel on the cams 20 and 19 as the carrier 3 rotates. Rotary motion is imparted to the carrier 3 by means of a ring gear 23 which surrounds the carrier close to the bottom and is securely attached thereto. This ring gear 23 is engaged by a pinion on a gear head motor not shown.

The speed of rotation of the carrier 3 depends on the type of molding composition used, the temperature of the molding composition, and the size of the articles being molded. Some molding compositions require a longer period of curing time; and, secondly, if the molding composition is preheated before it is fed to the mold cavity, the curing time required is decreased and the speed of rotation can be increased. Also molded articles having a relatively heavy wall require a longer curing cycle. The speed of rotation of the machine may be adjusted to suit the particular molding purpose.

The lower plungers 7 are cushioned by a fluid-actuated metal bellows 24 housed in a sealed chamber 25 located in the lower region of the carrier 3 directly beneath the plungers 7. A pin 26 is attached to the diaphragm 27 of the bellows 24, and said pin passes up through the bellows and through an opening in the top of the sealed chamber 25. The top end of the pin 26 is rotatably attached to the bottom of the plungers 7. This is accomplished by grinding an annular recess 28 close to the top of the pin 26. A holding pin 29 passes through a drilled hole in the plunger 7 and through a portion of the annular recess 28 of the pin 26. This arrangement prevents the pin from moving vertically with respect to the plunger but allows the plunger to turn with respect to the pin. A shoulder 30 is provided on the pin 26 to engage the bottom surface of the top of the housing 25. This shoulder 30 prevents the bellows from being compressed by the fluid when the mold is open.

Located in the center of the machine close to the top is a fluid reservoir 31. The fluid is maintained in this reservoir under a pressure of approximately 2500 pounds per square inch depending, of course, on the pressure required for molding. The pressure of the fluid in the system is indicated on the gauge 32 located at the top of the machine. The gauge 32 is connected to a main fluid line 33 by means of an auxiliary line 34. The main fluid line 33 passes down through the center of the machine to the bottom thereof, at which point it is connected to radial passages 35 provided in the carrier 3; one radial passage 35 is provided for each bellows 24. The radial passages 35 are connected to the interior of the bellows housing 25 by means of a vertical passage 36.

The fluid pressure system may be operated hydraulically or pneumatically. If the system is operated hydraulically, it is desirable to place a pneumatic bulb in the reservoir 31. This pneumatic bulb is designated by the numeral 37 in Figure 1. The pneumatic bulb 37 acts as a cushion for the hydraulic fluid in the system. It will be understood that the gas in the bulb and the fluid in the system are under the same pressure. In building up the pressure in the system, the bulb is first filled with a gas, preferably nitrogen, to a pressure of approximately 1500 pounds per square inch. The hydraulic fluid is then pumped into the system compressing the bulb until the pressure of the gas and the hydraulic fluid is approximately 2500 pounds per square inch. It will be understood, of course, that the pressure does not have to be the same for all types of molded articles. The example given above is for a relatively large article—smaller articles require less pressure. The pressure applied to the molded article is determined by the pressure of the fluid in the fluid system.

Surrounding the upper and lower plungers 6 and 7 are electrical heating elements 38 and 39. These heating elements heat plungers 6 and 7 and by conduction through the plungers heat the mold elements 8 and 9. These heating elements 38 and 39 are energized by current flowing through bus bars 40 and 41. The heating elements 38 are separated from the heating elements 39 and, therefore, the heating elements 38 for the top plungers can be controlled separately from the elements 39 for the bottom plungers. The current for these heating elements is commutated through slip rings 42 located at the top of the machine. In the device illustrated there are eight slip rings at this point, two of which supply the current to the heaters surrounding the top plunger 6 and two of which supply current to the heaters surrounding the bottom plunger 7. The other four slip rings supply current to the indicators located at the top of the machine. Located close to the heating elements 38 and 39 and passing around the entire circumference of the machine are circular thermocouples 43. These thermocouples 43 can be adjusted to whatever temperature is desired in the heating elements. By means of the thermocouples it is possible to maintain heating elements 38 at a different temperature from the temperature of the bottom heating elements 39.

In the view shown in Figure 1, the mold assembly shown at the right of the machine is in closed position, and the molded article 44 is passing through the curing cycle. The mold shown in the left of Figure 1 has just started to open, the cam rollers 17 and 18 being in contact with the lifting cam surface 19. The development of this lifting cam 19 and the pressure cam 20 is shown in Figure 3. The cam roller 17 first engages the lifting cam 19 at point A (Figure 3). During the initial upward movement of the mold elements, the mold is closed by reason of the pressure exerted by the fluid pressure-applying means. This pressure is applied to the mold until the shoulder 30 of the pin 26 contacts the top of the bellows housing 25. This initial upward movement of the mold elements is caused by the pressure exerted by the fluid in the system, the pressure cam 20 being provided with relief in this area to allow plunger 6 to rise. After the upward movement of the bottom mold 9 is prevented by the shoulder 30, the mold elements are separated by the ascension of the cam rollers 17 and 18 on the portion B of the lifting cam 19. The lifting cam 19 is so contoured as to keep the mold open in the area C to accomplish removal of the molded article from the force plug and recharging of the mold cavity. The cam rollers 17 and 18 then descend portion D of cam 19, and the mold is thereby closed. This closing action of the mold is caused by the weight of the plunger 6. After the mold is closed, cam roller 15 engages point E on pressure cam 20. This forces ram 6 down which, in turn, forces ram 7 down against the fluid pressure system. When cam roller 15 is at point E on pressure cam 20, the molding composition is under maximum pressure.

It will be clear from the description given above that the mechanical movement imparted to the mold elements by the pressure cam 20 and the lifting cam 19 is always the same, and any change in the molding pressure applied to the molding composition for different size molded articles is accomplished by changing the pressure of the fluid in the fluid pressure system.

In the event molding compositions are used which require a breathing period to permit the escape of entrapped gases, there is provided on the lifting cam a portion 45 which raises the top mold element 8 sufficient to release the pressure and allow the entrapped gases to escape. The pressure cam 20 is provided with a cut-out portion 46 to allow the cam roller 15 to rise in the area in which the cam rollers 17 and 18 contact the raised portion 45 on the lifting cam.

Figure 2:
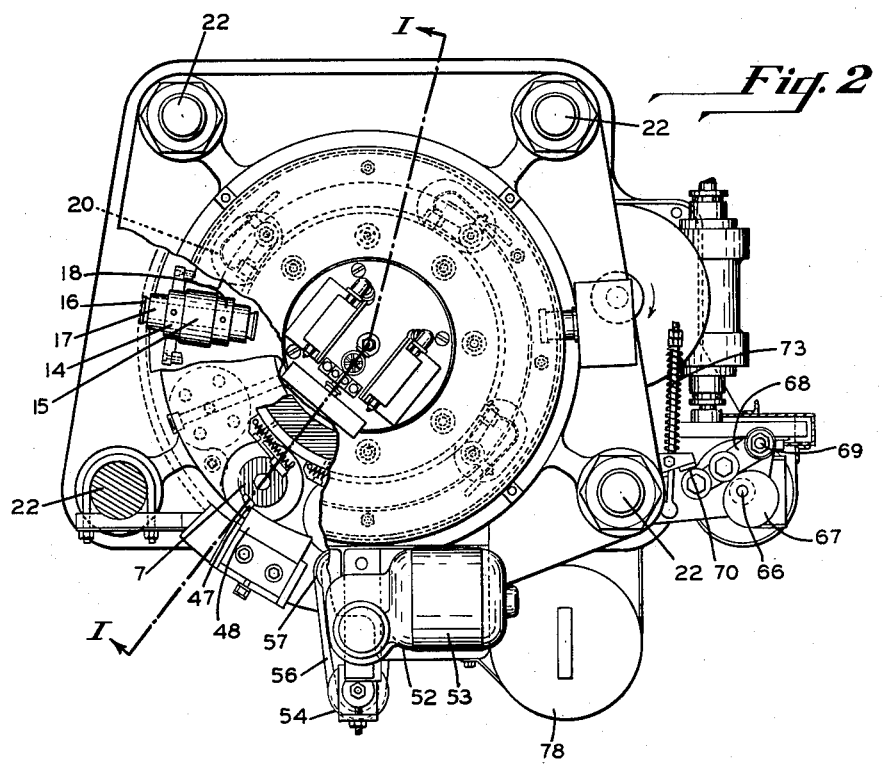
Figure 2 is a top plan view of the device with certain sections cut away to show certain details.
Figure 5:
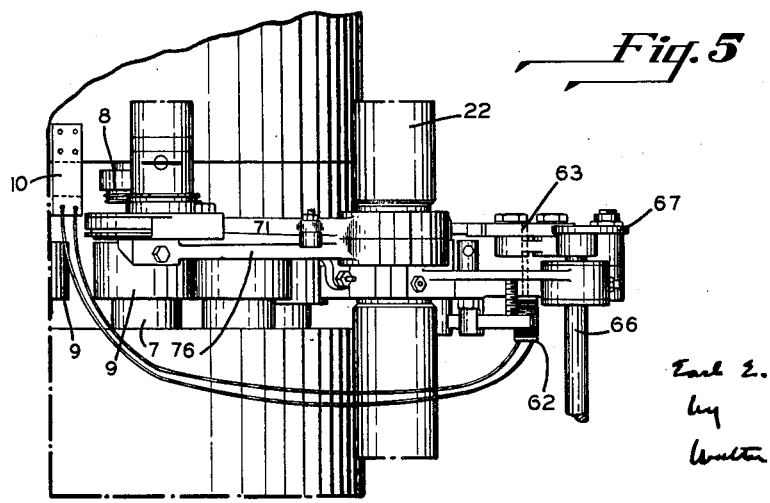
Figure 5 is an elevational view of the feeding mechanism for the device.

In order to break the bond between the molded piece 44 and the force plug 8 to facilitate unscrewing, it has been found desirable to provide a mechanism for partially rotating the mold cavity 9 at the time the pressure is released immediately before the mold starts to open. This is accomplished by a projection 47 on the plunger 7 which strikes a block 48 (Figure 2) secured to the frame of the machine. This rotates the plunger 7 and the mold cavity 9 through an acute angle and partially unscrews the molded piece from the force plug. In molding it has been found desirable to break this initial bond to facilitate unscrewing.

In molding smaller articles such as bottle closures having a smooth exterior surface, it has been found that the partial rotating of the mold cavity does not always break the bond between the force plug and the molded article inasmuch as the cavity rotates, breaking the bond between the cavity and the molded articles rather than the bond between the force plug and the molded article. In order to loosen these small molded articles, I have provided a small vibrator unit shown at 49 in Figure 6. This vibrator unit 49 is provided with a ram 50 to which is attached a resilient block 51 which contacts the skirt of the molded article as it passes. The vibrating motion imparted to the rubber block 51 by the vibrator 49 jars the molded article and breaks the bond between it and the force plug. The position of the vibrator 49 and the direction of its action is such that it tends to unscrew the molded article from the force plug.

After the bond between the molded article and the force plug has been broken, the molded article is contacted by an unscrewing device shown generally at 52. This unscrewing device consists of a gear head motor 53 mounted on a platform 54 secured to the head 21 of the machine. The motor 53 rotates a pulley 54 through a flexible cable 55 or other suitable driving mechanism. The pulley 54 imparts rotary motion to a bolt 56 which travels around idler pulleys 57 and 58. The position of the unscrewing mechanism is such that the belt, while traveling between idler pulleys 57 and 58, will engage the skirt of the molded article carried by the force plug 8. Since the belt is moving in the direction of the arrow shown in Figure 6, it rotates the molded article and unscrews it from the force plug. The molded article, as it is removed from the force plug, drops into the chute 59 which is directed into a suitable receptacle not shown.

After leaving the unscrewing device, the force plug next travels past a small contact switch 60 provided with a contact button 61. The positioning of the button 61 is such that a passing force plug will not contact it. However if the unscrewing mechanism fails to remove the cap from the force plug, the cap will contact the button 61, closing the microswitch 60 which energizes a solenoid 62 connected to the microswitch 60 by suitable conductors. Upon energization of the solenoid 62, a pin 63 is urged up through an opening in bracket 64 supporting the feeding mechanism shown generally at 65. When the pin 63 is in its raised position, it blocks the path of the feeder actuating mechanism and prevents the feeding of powder to the cavity which is the complement of the force plug carrying the molded article. The operation of this safety device is more fully hereinafter described.

The feeding mechanism 65 operates directly from the main drive mechanism through a shaft 66 to the top of which is secured a cam 67. This cam 67 operates against a pivoted arm 68 which pivots about pivot point 69. The opposite end of the pivoted arm 68 operates against an anvil surface 70 on the end of rocker arm 71. Rocker arm 71 pivots at point 72 on one of the columns 22, compressing spring 73. The other end of the rocker arm 71 is provided with a feeding shoe 74 which passes over the mold cavity and deposits molding composition therein. The feeding shoe is composed of two parts, the bottom being slidable with respect to the top. The sliding bottom 75 is secured to arm 76 which also pivots around point 72. As the feeding shoe moves in over the mold cavity, the arm 76 strikes a stop on the frame of the machine. This stop prevents the arm 76 and the attached bottom slide 75 from moving in over the mold cavity, and the molding composition carried by the shoe 74 is thereby deposited in the cavity. The inward movement of rocker arm 71, after arm 70 has been stopped, compresses spring 77. The expansion of spring 77 as rocker arm 71 is moving away from the mold cavity forces the slidable bottom 75 under the feeding shoe, and the shoe is ready to receive another charge of molding composition from the hopper 78.

In order to stop the action of the feeder in the event the molded article has not been removed from the force plug, the microswitch 60 is so positioned that the force plug passes it when the feeding shoe 74 is at the end of its back stroke. At this time the high part of the cam 67 has forced the pivoted arm 68 back which, in turn, has forced the anvil end 70 of the rocker arm 71 back against the compression of spring 73. In this position the pivoted arm 68 is back sufficiently far that the pin 63 can rise in front of it preventing its forward movement, thereby holding the feeding shoe out so that no molding composition will be fed to the cavity which complements the force plug carrying the molded article. After the molded article carried by the force plug is no longer in contact with the microswitch 60, the solenoid is no longer energized and the pin 63 drops by its own weight; however by this time cam 67 has rotated to a point where it will not permit the feeding shoe to move in over the mold cavity.

If the molded article has been removed from the force plug, the solenoid 62 will not be energized; and the feeding mechanism will supply a new charge of molding composition to the cavity in its intended manner.

The molding composition may be fed into the mold cavity in the form of loose powder or as a preformed pill and may be preheated if desired. Such preheating decreases the amount of time required to cure the molded piece, and consequently, increases the speed of the machine.

In the event the article being molded requires a knock-out device to remove it from the force plug, this may be accomplished by operating a suitable knock-out device through the plungers 6.

In the operation of my machine a charge of molding composition such as "Bakelite" or other thermosetting composition in powder form or as a preformed pill is placed in the mold cavity 9 while the mold is open. As the machine rotates, the plunger 6 drops, closing the mold. After the mold is closed, the roller 15 contacts the pressure cam 20 and compresses the molding composition in the mold cavity. Inasmuch as the downward movement of the plunger 6 is greater than the distance between the mold units when they are in open position, the lower mold unit 9 is forced downward, expanding the bellows 24 which acts against the fluid in the sealed system, thus applying molding pressure to the molding composition. While the molding pressure is applied, the mold continues to rotate around the machine in a closed path for approximately 70% of the circumference of the machine. After this curing cycle is completed, the cam roller 15 passes over a relief area in the pressure cam 20. This permits the fluid in the fluid pressure system to force the mold assembly upward until the shoulder 27 of the pin 26 strikes the bellows housing 25. When the shoulder 27 of pin 26 engages the top of the bellows housing 25, the pressure of the fluid in the system is no longer exerted on the mold cavity. At this point in the circular path of travel of the mold assembly, the projection 47 on plunger 7 strikes block 48 on the frame of the machine and rotates the plunger 7 and its accompanying mold cavity 9 through an acute angle, thus breaking the bond between the force plug and the molded piece.

At approximately the same time the mold cavity 9 is being rotated through an acute angle, the cam rollers 17 and 18 contact the opening cam 19; and the plunger 6 is raised upwardly, separating the mold elements, and exposing the molded article. In the event the articles being molded are small and have a smooth outer surface, it may be necessary to employ additional means to break the bond between the force plug 8 and the molded article. To accomplish this, the exposed molded article carried by the force plug contacts a resilient block 51 positioned in the path of travel of the mold elements. The resilient block 51 is attached by means of a plunger 50 to a vibrator 49. This device vibrates the cap sufficiently to break the bond between the force plug 8 and the molded article.

The molded article carried by the force plug 8 continues in its circular path of travel and is contacted by the unscrewing belt 56 which is traveling in a direction so that it will unscrew the molded article from the force plug 8; and the molded article drops into a chute 59 directing it to a suitable receptacle.

Continuing in its circular path, the force plug 8 next passes a microswitch button 61 which is so positioned that the force plug itself will not contact the switch button 61; however if the force plug is carrying a molded article, the molded article will touch the switch button 61.

If for any reason the molded article has not been removed from the force plug by the unscrewing mechanism, the molded article carried by the force plug will contact the button 61, closing the microswitch 60 which, in turn, energizes a solenoid 62. When solenoid 62 is energized, it raises a pin 63 which obstructs the operation of the feeder mechanism, preventing the feeding of molding composition to the complementary mold cavity.

If the molded article has been removed from the force plug, the feeding mechanism operates in its normal manner and supplies molding composition to the mold cavity, and the cycle is repeated.

While I have illustrated and described certain preferred embodiments of this invention, it will be understood that the invention is not so limited, but may be otherwise practiced within the scope of the following claims.

I claim:

1. In a molding machine, a supporting base, a carrier mounted for rotation with respect to said base, a pair of cooperating mold elements mounted on the carrier for rotation therewith in a closed path, a fluid operated bellows connected to one of said elements; a source of fluid under pressure including a fluid reservoir containing a pneumatic cushion therein, and means communicating said fluid under pressure to said bellows to apply force thereto, said source, communicating means, and bellows constituting a sealed system in which said bellows is movable; a head portion secured to said base; a cam on said head portion and a cam follower rotatable on the end of the other cooperating mold element, said cam follower being engageable with said cam; and means for imparting rotation to said carrier to cause said cam follower to move on said cam, said cam being so contoured as to raise and lower the cam follower to impart movement to the mold member connected thereto to bring the same into predetermined position and into cooperative relationship with said pressure-loaded element.

2. In a molding machine, a supporting base, a carrier mounted for rotation with respect to said base, a pair of cooperating mold elements mounted on the carrier for rotation therewith in a closed path, a fluid operated bellows connected to one of said elements; a source of fluid under pressure including a fluid reservoir and pneumatic means for applying pressure to the fluid in the reservoir, said source being rotatable with said carrier, means communicating said fluid under pressure to said bellows to apply force to said bellows, said source, communicating means, and bellows constituting a closed sealed system in which said bellows is movable; a head portion rigidly secured to said base; a cam on said head portion and a cam follower rotatable on the end of the other cooperating mold element, said cam follower being engageable with said cam; and means for imparting rotation to said carrier to cause said cam follower to move on said cam, said cam being so contoured as to raise and lower the cam follower to impart movement to the mold member connected thereto to bring the same into predetermined position and into cooperative relationship with said pressure-loaded element.

3. In a molding machine, a supporting base, a carrier mounted for rotation with respect to said base, a pair of cooperating mold elements mounted on the carrier for rotation therewith in a closed path, a fluid operating bellows connected to one of said elements; a source of fluid under pressure including a fluid reservoir and a gas-containing accumulator for applying pressure to the fluid in the reservoir, said fluid source being rotatable with said carrier, means communicating said fluid under pressure to said bellows to apply force to said bellows, said source, communicating means, and bellows constituting a sealed system in which said bellows is movable; a head portion rigidly secured to said base; a system of cams secured to said head portion; a plurality of cam followers rotatable on the end of the other cooperating mold element, one cam follower being engageable with a cam to hold the mold elements in closed position and the other cam follower being engageable with a cam to separate the mold elements; and means for imparting rotation to said carrier to cause said cam followers to move on said cams, one of said cams being so contoured as to hold the mold elements in closed position against the fluid pressure in the sealed system and the other of said cams being so contoured as to open and close the mold elements.

4. In a rotary molding machine, a rotatable carrier, a plurality of pairs of complementary mold elements mounted on the carrier for rotation therewith, a metal bellows connected to one of the mold elements of each of said pairs; a source of liquid under pressure including a liquid reservoir and pneumatic means for applying a constant pressure to the liquid in the reservoir, means communicating said liquid under pressure to said bellows to apply the force thereof constantly to said bellows, said source, communicating means, and bellows constituting a sealed system in which the bellows can expand and contract; and mechanical means connected to the second mold element of each of said pairs and operated by rotation of said carrier for sequentially moving said second mold element to a fixed position and into cooperative relationship with their respective complementary liquid pressure-loaded mold elements to develop molding force therebetween and for sequentially opening and closing said mold elements.

5. In a rotary molding machine, a rotatable carrier; a plurality of pairs of complemental mold elements mounted on the carrier for rotation therewith; a fluid pressure bellows connected to one of the mold elements of said pairs and movable within a sealed chamber; a source of fluid under pressure; means for communicating said fluid under pressure to said sealed chamber to apply the force thereof continuously to said bellows, said bellows being compressible and expansible in their sealed chambers; a pneumatic cushion for the fluid in the sealed system; and mechanical means connected to the second mold element of each of said pairs for imparting movement sequentially to said second mold element to bring the same into fixed position and into cooperative relationship with their respective complemental fluid pressure-loaded mold elements.

6. In a rotary molding machine, a rotatable carrier; a plurality of pairs of complemental mold elements mounted on the carrier for rotation therewith; a fluid pressure bellows connected to one of the mold elements of said pairs and movable within a sealed chamber; a source of fluid under pressure; means for communicating said fluid under pressure to said sealed chamber to apply the force thereof continuously to said bellows, said bellows being compressible and expansible in their sealed chambers; a pneumatic cushion for the fluid in the sealed system; mechanical means connected to the second mold element of each of said pairs for imparting movement sequentially to said second mold element to bring the same into a fixed position and into cooperative relationship with their respective complemental fluid pressure-loaded mold elements; and means to separate said second mold elements from their respective complemental mold elements.

7. In a rotary molding machine, a rotatable carrier; a plurality of pairs of complemental mold elements mounted on the carrier for rotation therewith; a fluid pressure bellows connected to one of the mold elements of said pairs and movable within a sealed chamber; a source of fluid under unvarying pressure; means for communicating said fluid under pressure to said sealed chamber to apply the force thereof continuously to said bellows, said bellows being compressible and expansible in their sealed chambers; a pneumatic cushion for the fluid in the sealed system; mechanical means connected to the second mold element of each of said pairs for imparting movement sequentially to said second mold element to bring the same into fixed position and into cooperative relationship with their respective fluid-loaded mold elements during the major portion of the cycle of rotation of the carrier; and means for separating the mold elements during the remainder of the cycle of rotation.

EARL E. HEINZELMAN.

REFERENCES CITED

The following references are of record in the file of this patent:

UNITED STATES PATENTS

| Number | Name | Date |
| --- | --- | --- |
| 2,155,316 | Lauterbach | Apr. 18, 1939 |
| 2,290,479 | Mercier | July 21, 1942 |
| 2,304,141 | Bergmann | Dec. 8, 1942 |
| 2,325,119 | Flowers | July 27, 1943 |
| 2,354,029 | Kingston | July 18, 1944 |
| 2,440,367 | Cropp | Apr. 27, 1948 |
| 2,445,742 | Hoch | July 20, 1948 |